United States Patent
Rihan et al.

(10) Patent No.: US 9,309,434 B2
(45) Date of Patent: Apr. 12, 2016

(54) SCRATCH RESISTANT REFINISH CLEARCOAT

(75) Inventors: Ali Rihan, Toledo, OH (US); Anthony J. Tye, Waterville, OH (US)

(73) Assignee: BASF Coatings GmbH, Muenster (DE)

( * ) Notice: Subject to any disclaimer, the term of this patent is extended or adjusted under 35 U.S.C. 154(b) by 30 days.

(21) Appl. No.: 13/878,435

(22) PCT Filed: Oct. 19, 2011

(86) PCT No.: PCT/US2011/056797
§ 371 (c)(1),
(2), (4) Date: Apr. 9, 2013

(87) PCT Pub. No.: WO2012/054547
PCT Pub. Date: Apr. 26, 2012

(65) Prior Publication Data
US 2013/0202893 A1 Aug. 8, 2013

Related U.S. Application Data

(60) Provisional application No. 61/394,962, filed on Oct. 20, 2010.

(51) Int. Cl.
| | | |
|---|---|---|
| *C09D 133/14* | (2006.01) | |
| *C09D 133/08* | (2006.01) | |
| *C08G 18/36* | (2006.01) | |
| *C08G 18/62* | (2006.01) | |
| *C08G 18/65* | (2006.01) | |
| *C09D 175/04* | (2006.01) | |

(52) U.S. Cl.
CPC .............. *C09D 133/14* (2013.01); *C08G 18/36* (2013.01); *C08G 18/6229* (2013.01); *C08G 18/6254* (2013.01); *C08G 18/6547* (2013.01); *C09D 175/04* (2013.01); *Y10T 428/31551* (2015.04)

(58) Field of Classification Search
CPC .......... C08G 18/6229; C08G 18/6254; C08G 18/6547; C08G 18/36; C09D 175/04; C09D 133/14
USPC ................................ 427/140, 423.1; 524/507
See application file for complete search history.

(56) References Cited

U.S. PATENT DOCUMENTS

| | | | | |
|---|---|---|---|---|
| 4,339,365 | A * | 7/1982 | Becher et al. ................. | 523/400 |
| 4,578,426 | A * | 3/1986 | Lenz et al. .................... | 525/131 |
| 5,059,655 | A | 10/1991 | Martz et al. | |
| 5,212,210 | A | 5/1993 | Halm | |
| 5,432,221 | A * | 7/1995 | Polaski et al. ................. | 524/310 |

FOREIGN PATENT DOCUMENTS

| | | |
|---|---|---|
| JP | 072823 A | 1/1995 |
| JP | 07102046 A | 4/1995 |
| JP | 07504700 A | 5/1995 |
| WO | 2009123684 A2 | 10/2009 |

OTHER PUBLICATIONS

Castor Oil, About.com, retrieved Sep. 30, 2014 (http://chemistry.about.com/od/factsstructures/ig/Chemical-Structures---C/Castor-Oil.htm).*
Wicks et al., "Organic Coatings: Science and Technology", John Wiley & Sons, Feb. 5, 2007.*
Dow Answer Center—Hydroxyl Number, Dec. 3, 2014.*

* cited by examiner

*Primary Examiner* — Randy Gulakowski
*Assistant Examiner* — Christopher M Rodd
(74) *Attorney, Agent, or Firm* — Quinn Law Group, PLLC

(57) ABSTRACT

Scratch resistance and/or reflow of a refinish topcoat is improved by preparing the topcoat from a refinish topcoat coating composition comprising an unsaturated fatty acid ester polyol that does not undergo oxidative cure when the applied refinish topcoat coating composition is cured.

18 Claims, No Drawings

SCRATCH RESISTANT REFINISH CLEARCOAT

FIELD OF THE DISCLOSURE

The present invention relates to automotive refinish compositions, to methods for preparing and using such compositions, to refinish coatings on a substrate, and to articles such as automotive vehicles with refinish coatings on them.

INTRODUCTION TO THE DISCLOSURE

Automotive topcoat finishes include basecoat/clearcoat topcoats, in which the topcoat is applied in two layers, a first layer of a pigmented basecoat composition and a second layer of a clearcoat composition, as well as single-stage or monocoat topcoats, which are one-layer, pigmented, glossy topcoats. Basecoat/clearcoat coatings are desirable for their high level of gloss and depth of color. In addition, basecoats having special effect pigments, e.g., flake pigments such as metallic and pearlescent pigment, can achieve excellent gonioapparent effect in basecoat/clearcoat composite coatings.

Polyurethane clearcoat and single stage topcoat (or monocoat) systems have been widely used for many years for refinish coatings. These systems contain hydroxyl-functional resins that cure by reaction with polyisocyanates to form polyurethanes with generally excellent film properties including durability, toughness, and solvent resistance. In automotive refinish coating compositions, the polyisocyanates are not blocked so that the reaction with the hydroxyl groups will take place within a reasonable amount of time without heating or with heating at low temperatures of perhaps up to 150° F. Given the reactivity between the unblocked polyisocyanate and the hydroxyl-functional polyol under typical storage conditions, these materials are segregated into separately stored components until mixing just shortly before application of the coating composition to the substrate to be coated. This type of coating composition, in which the materials that react to cure the coating (resin and crosslinker) are segregated in separately stored components designed to be combined just before application, is referred to in the art as a "two-component" or "multi-component," "two-package" or "multi-package," or "2K" coating composition. Automotive refinish clearcoats may include other separately stored components, such as reducers used to provide desirable application characteristics for the particular application conditions (e.g., a fast reducer for cold weather, a slower reducer for hot weather). For a single stage topcoat or monocoat systems, a multi-component or multi-package coating composition includes multiple, differently colored bases containing pigment and hydroxyl-functional resin, one or more of which is combined with a polyisocyanates crosslinker component and, optionally, a reducer or other component just before application.

The polyisocyanate crosslinker has been used with a hydroxyl-functional acrylic resin or polymer. Once applied and cured, the outer coating layer, whether it is a clearcoat layer or a pigmented monocoat layer, should be resistant to weathering degradation (e.g., retain its gloss on exposure to sunlight) and resistant to scratching and marring that can detract from the appearance of the coated vehicle. Proposals for improving scratch and mar resistance have included using silicone or fluorinated polymers or additives, which are relatively expensive and can cause other problems (e.g., cratering in the coating and difficulty for recoat).

SUMMARY OF THE DISCLOSURE

We have invented a composition for a scratch-resistant coating, which may be a clearcoat or single-stage topcoat, a coating prepared from the composition, and an article coated with the coating. We also disclose methods of making and using the composition.

Disclosed is a method of increasing scratch resistance and/or reflow of a refinish topcoat, comprising preparing the topcoat from a refinish topcoat coating composition comprising an unsaturated fatty acid ester polyol having at least two hydroxyl groups that does not undergo oxidative cure when the applied refinish topcoat coating composition is cured because the refinish topcoat coating composition is free of any drier. In various embodiments of this method, the unsaturated fatty acid ester polyol is included in an amount from about 10% to about 50% by weight of the total nonvolatile weight of hydroxyl-functional materials in the refinish topcoat coating composition. In various embodiments of this method, the unsaturated fatty acid ester polyol may be a soy oil- or castor oil-based polyol and/or the unsaturated fatty acid ester polyol may have three or four hydroxyl groups.

A refinish, multi-component topcoat coating composition includes at least one first package including (a) of an unsaturated fatty acid ester polyol having at least two hydroxyl groups and (b) an acrylic polymer having a hydroxyl number of about 37 to about 170, wherein the composition comprises from about 10% to about 50% by weight, based on the total nonvolatile weight of components (a) and (b). of component (a). The at least one first package may optionally include a pigment. In certain embodiments, components (a) and (b) together may be the only hydroxy-functional components in the first package; in other embodiments, components (a) and (b) together are at least about 90% by weight, preferably at least about 95% by weight, of all hydroxy-functional components in the first package. In this description, "polymer" with be used to include both oligomeric and polymeric materials. The composition also has a polyisocyanate crosslinker separated during storage from the hydroxyl-functional components (a) and (b). The coating composition is free or essentially free of any drier, by which is meant that no drier is intentionally added to the composition (although such a compound may be present through an impurity in another component of the coating composition); no drier is present in an amount effective to catalyze oxidative cure. The refinish, multi-component coating composition includes a second package containing a polyisocyanate crosslinker, and, optionally, one or more reducers. If pigment is present in the first package, the refinish, multi-component topcoat coating composition produces a single stage, pigmented topcoat.

A method of refinishing a substrate includes combining the at least one first package (whether an unpigmented first package or one or more pigmented first packages, known as "bases"), the second package, and optionally one or more reducers to form a refinish topcoat coating composition mixture including components (a) and (b) and the polyisocyanate crosslinker, applying the refinish coating composition mixture to all of a surface area of a substrate or to a part of the surface area of the substrate, and curing the applied composition mixture to form a cured refinish topcoat layer from the applied refinish topcoat coating composition mixture. The refinish topcoat coating composition mixture has unexpectedly improved scratch resistance and/or reflow (annealing of film deformation). Also provided is the cured refinish coating and the article (particularly, an automotive vehicle or vehicle trailer) having on it the cured refinish coating.

"A," "an," "the," "at least one," and "one or more" are used interchangeably to indicate that at least one of the item is present; a plurality of such items may be present. Other than in the working examples provides at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. In addition, disclosure of ranges includes disclosure of all values and further divided ranges within the entire range.

DETAILED DESCRIPTION

The following description includes details of particular inventive embodiments.

The first component of the refinish, multi-component topcoat coating composition includes a component (a) of an unsaturated fatty acid ester polyol having at least two hydroxyl groups. In various embodiments, the unsaturated fatty acid ester polyol may have two, three, or four hydroxyl groups. In various embodiments, the unsaturated fatty acid polyols may have from one to twelve, preferably from 1 to 4, unsaturated carbon-carbon bonds. The unsaturated fatty acid ester polyol may be prepared by reacting one or more unsaturated fatty acids or reactive derivatives thereof such as methyl esters or triglycerides with a polyol. In various embodiments, the component (a) may be a soy oil- and/or castor oil-based polyol provided by transesterifcation of soy oil, castor oil, or a combination of these oils. Castor oil fatty acids include ricinoleic acid. Examples of such unsaturated fatty acid-based polyols include the polyol esters of unsaturated fatty acids with polyols having at least a plurality of hydroxyl groups. Nonlimiting examples suitable polyols having at least three hydroxyl groups include trimethylolpropane, di-trimethylolpropane, triethylolpropane, di-triethylolpropane, pentaerythritol, dipentaerythritol, tetrakis(2-hydroxyethyl)methane, diglycerol, xylitol, glucitol, dulcitol, sucrose, and combinations of these.

The polyol or polyols having a plurality of hydroxyl groups are reacted with the unsaturated fatty acid(s) to esterify the fatty acid(s) or with the esterifiable unsaturated fatty acid derivative (e.g., the glyceride oil) to transesterify the fatty acids, generating byproduct such as methanol from fatty acid methyl esters or glycerol from a triglyceride such as castor or soy oil. Techniques for esterification of fatty acids or transesterification of fatty acid triglycerides are well known and described, for example, in Treasurer, U.S. Pat. No. 5,504,145 and Xiao, U.S. Pat. No. 7,462,679, the disclosures of each of which are incorporated herein by reference.

Some castor-oil based polyols are commercially available. Mention may be made of the POLYCIN™ M-365 and -280 castor oil based products, sold by Vertelllus Performance Materials Inc., Greensboro N.C., USA, and RENUVA™ soy-based polyols, sold by the Dow Chemical Company.

The first component of the refinish, multi-component coating composition also includes (b) an acrylic polymer having a hydroxyl number of about 37 to about 170. In various embodiments, the hydroxyl number may be from about 120 to about 160 or any of the ranges contained within these limits. In various embodiments the acrylic polymer may have a number average molecular weight of about 1100 to about 8200.

Suitable hydroxyl-functional acrylic resins may be prepared by polymerizing one or more hydroxyl-functional, eth-ylenically unsaturated monomers with one or more other ethylenically unsaturated monomers. Suitable examples of hydroxy-functional ethylenically unsaturated monomers include hydroxy alkyl esters of acrylic or methacrylic acid. (In the context of this description, the term "(meth)acrylate" will be used to indicate that both the methacrylate and acrylate esters are included.) Nonlimiting examples of hydroxyl-functional monomers include hydroxyethyl(meth)acrylate, hydroxypropyl(meth)acrylates, hydroxybutyl(meth)acrylates, hydroxyhexyl(meth)acrylates, other hydroxyalkyl (meth)acrylates having branched or linear alkyl groups of up to about 10 carbons, and mixtures of these. ε-Caprolactone esters of these hydroxyl-functional monomers may also be used. The hydroxyl groups may also be esterified with ε-caprolactone following polymerization. Generally, at least about 5% by weight hydroxyl-functional monomer is included in the polymer. Example embodiments include up to about 15% by weight hydroxyl-functional monomer in the polymer. In certain embodiments, a hydroxyl-functional acrylic polymer polymerized from hydroxyethyl(meth)acrylate, hydroxypropyl(meth)acrylates, and mixtures of these may be used in the first component. The person skilled in the art will appreciate that hydroxyl groups can be generated by other means, such as, for example, the ring opening of a glycidyl group, for example from glycidyl methacrylate, by an organic acid or an amine. Hydroxyl functionality may also be introduced through thio-alcohol compounds, including, without limitation, 3-mercapto-1-propanol, 3-mercapto-2-butanol, 11-mercapto-1-undecanol, 1-mercapto-2-propanol, 2-mercaptoethanol, 6-mercapto-1-hexanol, 2-mercaptobenzyl alcohol, 3-mercapto-1,2-proanediol, 4-mercapto-1-butanol, and combinations of these. Any of these methods may be used to prepare a useful hydroxyl-functional acrylic polymer.

Examples of suitable comonomers that may be polymerized along with a hydroxyl-functional, ethylenically unsaturated monomer include, without limitation, acrylic acid, methacrylic acid, and crotonic acid; esters, nitriles, and amides of acrylic acid, methacrylic acid, and crotonic acid; vinyl esters, vinyl ethers, vinyl ketones, vinyl amides, and aromatic and cycloaliphatic vinyl compounds. Representative examples include, without limitation, acrylic and methacrylic acid amides and aminoalkyl amides; acrylonitrile and methacrylonitriles; esters of acrylic and methacrylic acid, particularly those with saturated aliphatic and cycloaliphatic alcohols containing 1 to 20 carbon atoms such as methyl, ethyl, propyl, butyl, 2-ethylhexyl, isobutyl, isopropyl, cyclohexyl, tetrahydrofurfuryl, isobornyl, 2-tert-butyl cyclohexyl, 4-tert-butyl cyclohexyl, acrylates and methacrylates; unsaturated dialkanoic acids and anhydrides such as fumaric, maleic, itaconic acids and anhydrides and their mono- and diesters with alcohols such as methanol, ethanol, propanol, isopropanol, butanol, isobutanol, and tert-butanol, like maleic anhydride, maleic acid dimethyl ester and maleic acid monohexyl ester; vinyl acetate, vinyl propionate, vinyl ethyl ether, and vinyl ethyl ketone; styrene, α-methyl styrene, vinyl toluene, 2-vinyl pyrrolidone, and p-tert-butylstyrene. The co-monomers may be used in any desired combination to obtain desired coating properties.

The acrylic polymer may be prepared using conventional techniques, such as by heating the monomers in the presence of a polymerization initiating agent and optionally a chain transfer agent. The polymerization is preferably carried out in solution, although it is also possible to polymerize the acrylic polymer in bulk or as an emulsion.

Typical initiators are organic peroxides such as dialkyl peroxides such as di-t-butyl peroxide, peroxyesters such as t-butyl peroxy 2-ethylhexanoate, and t-butyl peracetate, peroxydicarbonates, diacyl peroxides, hydroperoxides such as t-butyl hydroperoxide, and peroxyketals; azo compounds such as 2,2'azobis(2-methylbutanenitrile) and 1,1'-azobis(cyclohexanecarbonitrile); and combinations of these. Typical chain transfer agents are mercaptans such as octyl mercaptan, n- or tert-dodecyl mercaptan; halogenated compounds, thiosalicylic acid, mercaptoacetic acid, mercaptoethanol and the other thiol alcohols already mentioned, and dimeric alpha-methyl styrene.

The reaction is usually carried out at temperatures from about 20° C. to about 200° C. The reaction may conveniently be done at the temperature at which the solvent or solvent mixture refluxes, although with proper control a temperature below the reflux may be maintained. The initiator should be chosen to match the temperature at which the reaction is carried out, so that the half-life of the initiator at that temperature should preferably be no more than about thirty minutes. Further details of addition polymerization generally and of polymerization of mixtures including (meth)acrylate monomers is readily available in the polymer art.

The first package including the components (a) and (b) may also include other materials, such as solvent and conventional coating additives. When the refinish, multi-component coating composition is for a single stage topcoat, a plurality of first packages will be included as color bases as part of a mixer system that may be combined in predetermined amounts to provide a refinish coating of a desired color. An unpigmented first package may also be combined with the one or more color base first packages in making a single stage topcoat. Each color base includes one or more pigments dispersed according to known methods in the art. The first package or packages comprise from about 10% to about 50% by weight of component (a), the unsaturated fatty acid polyol, based on the total nonvolatile weight of component (a) and component (b), the acrylic polymer with hydroxyl number 37 to 170. In various embodiments, the first package (or each first package, if there are a plurality of first packages) comprises at least about 15%, at least about 20%, or at least about 25% by weight of component (a), based on the total nonvolatile weight of components (a) and (b); and in various embodiments, the first package comprises up to about 45%, up to about 40%, or up to about 35% by weight of component (a), based on the total nonvolatile weight of components (a) and (b).

The refinish, multi-component coating composition includes a second package including a polyisocyanate. Examples of suitable polyisocyanate crosslinkers include, without limitation, alkylene polyisocyanates such as hexamethylene diisocyanate, 2,2,4- and/or 2,4,4-trimethylhexamethylene diisocyanate, dodecamethylene diisocyanate, 1,4-diisocyanatocyclohexane, 1-isocyanato-3,3,5-trimethyl-5-isocyanatomethylcyclohexane (isophorone diisocyanate), 2,4'- and/or 4,4'-diisocyanatodicyclohexylmethane, 3-isocyanato-methyl-3,5,5-trimethyl cyclohexyl isocyanate, aromatic polyisocyanates such as 2,4'- and/or 4,4'-diisocyanato-diphenylmethane, 2,4- and/or 2,6-diisocyanatotoluene, naphthylene diisocyanate, and mixtures of these polyisocyanates. Generally, polyisocyanates having three or more isocyanate groups are used; these may be derivatives or adducts of diisocyanates. Useful polyisocyanates may be obtained by reaction of an excess amount of an isocyanate with water, a polyol (for example, ethylene glycol, propylene glycol, 1,3-butylene glycol, neopentyl glycol, 2,2,4-trimethyl-1,3-pentane diol, hexamethylene glycol, cyclohexane dimethanol, hydrogenated bisphenol-A, trimethylolpropane, trimethylolethane, 1,2,6-hexanetriol, glycerine, sorbitol or pentaerythritol), or by the reaction of the isocyanate with itself to give an isocyanurate. Examples include biuret-group-containing polyisocyanates, such as those described, for example, in U.S. Pat. No. 3,124,605 and U.S. Pat. No. 3,201,372 or DE-OS 1,101,394; isocyanurate-group-containing polyisocyanates, such as those described, for example, in U.S. Pat. No. 3,001,973, DE-PS 1,022,789, 1,222,067 and 1,027,394 and in DE-OS 1,929,034 and 2,004,048; urethane-group-containing polyisocyanates, such as those described, for example, in DE-OS 953,012, BE-PS 752,261 or U.S. Pat. Nos. 3,394,164 and 3,644,457; carbodiimide group-containing polyisocyanates, such as those described in DE-PS 1,092,007, U.S. Pat. No. 3,152,162 and DE-OS 2,504,400, 2,537,685 and 2,552,350; allophanate group-containing polyisocyanates, such as those described, for example, in GB-PS 994,890, BE-PS 761,626 and NL-OS 7,102,524; and uretdione group-containing polyisocyanates, such as those described in EP-A 0,377,177, each reference being incorporated herein by reference.

Certain embodiments of the second component package include one of aliphatic biurets and isocyanurates, such as the isocyanurates of hexamethylene diisocyanate and isophorone diisocyanate.

A third, optional package includes a reducing solvent, optionally a further resin or polymer, and optionally a catalyst for the isocyanate-hydroxyl curing reaction. The multi-component refinish composition may include multiple reducer packages, which may each be designed to be used under different weather conditions. For example, the multi-component refinish composition may include one reducer package having a relatively fast solvent for use in cold weather to speed evaporation of solvent from the applied coating layer, while a second reducer package has a relatively slow solvent for use in hot weather to allow the coating layer to flow out properly before all the solvent evaporates. In general, the solvent can be any organic solvent or solvents suitable for the binder materials. The solvent or solvents may be selected from aliphatic solvents or aromatic solvents, for example ketones, esters, acetates, toluene, xylene, aromatic hydrocarbon blends, or a combination of any of these. Generally, each of the first and second packages will also include one or more organic solvents.

The refinish composition may contain other materials, including additives such as pigments (which, as already described, are included in the case of single stage topcoat color bases), rheology control agents, surfactants, stabilizers, UV absorbers, hindered amine light stabilizers, and so on. Curing catalysts for the urethane reaction such as tin catalysts can be used in the coating composition. Typical examples are without limitation, tin and bismuth compounds including dibutyltin dilaurate, dibutyltin oxide, and bismuth octoate. When used, catalysts are typically present in amounts of about 0.05 to 2 percent by weight tin based on weight of total nonvolatile vehicle.

The pigment or filler may be any organic or inorganic compound or colored material, metallic or other inorganic flake material such as pearlescent mica flake pigments or metallic flake pigments such as aluminum flake, and the like that the art normally includes in such coatings. Such pigments may be used singly or in combination to provide a desired color of color base. Pigments and other insoluble particulate compounds such as fillers may be used in the refinish monocoat composition mixture in an amount of 1% to 100%, based on the total nonvolatile vehicle (i.e., a pigment-to-binder ratio of 0.1 to 1). The fillers or pigments can be introduced by first forming a mill base (also called pigment grind) with the hydroxyl functional resin or with other compatible polymers or dispersing resins by conventional techniques, such as sand-grinding, ball-milling, attritor grinding, and two roll milling, to disperse the pigments.

The refinish clearcoat or single stage topcoat is applied in a layer to a desired area of the substrate to be refinished and cured. The clearcoat is applied over an applied basecoat layer. The basecoat layer is allowed to dry before the clearcoat composition is applied. The clearcoat or single stage topcoat composition is then cured, at ambient or low temperature bake conditions. Because the coating composition is free or essentially free of any drier the clearcoat or single stage topcoat does not undergo oxidative curing at all or at least not to any appreciable extent.

The refinished substrate may be an automotive vehicle or a component of an automotive vehicle. The refinish coating compositions may, however, be applied to other articles for which a protective and/or decorative coating is desirable. Such articles may be those having parts or substrates that cannot withstand high temperature curing conditions or that cannot easily be placed in a high-bake oven.

The coatings and methods are further described in the following example. The examples are merely illustrative and not limiting. All parts are by weight unless otherwise indicated.

Example 1

Comparative Example

A two-component clearcoat refinish coating composition was prepared by combining the following materials in a separate first component and a separate second component.

Component 1: A 56% non-volatile clearcoat formulation was prepared, comprised of a styrenated acrylic resin with a $T_g$ of 24° C., a hydroxyl number of 136 mg. KOH/gm., and a number average molecular weight of 1400 daltons, a styrenated acrylic resin with a $T_g$ of 78° C., a hydroxyl number of 73 mg. KOH/gm., and a number average molecular weight of 6500 daltons, in a ratio of 84:16 first: second acrylic. The remainder of the clearcoat formulation was comprised of solvents, such as methyl iso-amyl ketone, n-butyl acetate, aromatic 100, xylene, ethyl 3-ethoxypropionate and acetone, and additives well known in the art, such as UV absorbers, silicone based flow agents, plasticizers and tin based catalysts.

Component 2: A 72% non-volatile hardener formulation was prepared, comprised of a solution of a hexamethylene diisocyanate based trimer with a percent isocyanate content of 22.6%. The remainder of the hardener formulation was comprised of solvents, such as n-butyl acetate, xylene, and toluene, and additives, such as tin based catalysts.

Component #1 and Component #2 were combined in a 73.5:26.5 weight ratio, resulting on a hydroxyl:isocyanate ratio of 1:1.3, reduced further with the above mentioned solvents to a non-volatile content of 34-38%, and spray applied over a test panel precoated with a BASF 90-Line black basecoat. The panel was allowed to dry at ambient temperatures for 15 minutes, then placed in a 140° F. for 18 hours before testing.

Example 2

Example of the Invention

A two-component clearcoat refinish coating composition was prepared by combining the following materials in a separate first component and a separate second component.

Component #1: To Component #1 of Example 1, Polycin M-365® (Vertellus Specialties Incorporated) was added in a weight ratio of 83:17.

Component #2: Component #2 was the same as Component #2 in Example 1.

Component #1 and Component #2 were combined in a 63:37 weight ratio, resulting on a hydroxyl:isocyanate ratio of 1:1.2, reduced further with the above mentioned solvents to a non-volatile content of 34-38%, and spray applied over a test panel precoated with a BASF 90-Line black basecoat. The panel was allowed to dry at ambient temperatures for 15 minutes, then placed in a 140° F. for 18 hours before testing.

Example 3

Comparative Example

Component 1: A 49% non-volatile clearcoat formulation was prepared, comprised of a styrenated acrylic resin with a $T_g$ of 9° C., a hydroxyl number of 125 mg. KOH/gm., and a number average molecular weight of 2700 daltons. The remainder of the clearcoat formulation was comprised of solvents, such as ethylene glycol butyl ether, methyl acetate, parachlorobenzotrifluoride, ethyl 3-ethoxypropionate and acetone, and additives well known in the art, such as UV absorbers, silicone based flow agents, plasticizers and tin based catalysts.

Component 2: A 37% non-volatile hardener formulation was prepared, comprised of a solution of a hexamethylene diisocyanate based trimer with a percent isocyanate content of 23.5%. The remainder of the hardener formulation was comprised of solvents, such as methyl acetate, parachlorobenzotrifluoride.

Component #1 and Component #2 were combined in a 63:37 weight ratio, resulting on a hydroxyl:isocyanate ratio of about 1:1.2, reduced further with the above mentioned solvents to a non-volatile content of 42-45%, and spray applied over a test panel precoated with a BASF 90-Line black basecoat. The panel was allowed to dry at ambient temperatures for 15 minutes, then placed in a 140° F. for 18 hours before testing.

Example 4

Example of the Invention

Component #1: To Component #1 of Example 3, Polycin M-365® (Vertellus Specialties Incorporated) was added in a weight ratio of 7:3.

Component #2: Component #2 was the same as Component #2 in Example 3.

Component #1 and Component #2 were combined in a 46:54 weight ratio, resulting on a hydroxyl:isocyanate ratio of 1:0.9, reduced further with the above mentioned solvents to a non-volatile content of 42-45%, and spray applied over a test panel precoated with a BASF 90-Line black basecoat. The panel was allowed to dry at ambient temperatures for 15 minutes, then placed in a 140° F. for 18 hours before testing.

Examples 1-4 were tested with the following results. The scratch test was carried out with an Atlas A.A.T.C.C. Crockmeter mounted with a ⅝" dowel covered with felt and 9 μm 3M 281Q WETODRY polishing paper, which was used to abrade the coating surface with ten (10) double strokes. The gloss before and after testing was measured according to ASTM method D523 for the tested surface area. The gloss was measured again according to ASTM method D523 after a re-flow bake.

| Crockmeter Test | | | | |
|---|---|---|---|---|
| | Example 1 | Example 2 | Example 3 | Example 4 |
| Initial 20° gloss after bake: | 85 | 85.7 | 86.7 | 83.5 |
| Final 20° gloss after scratch test: | 47 | 63.5 | 64.9 | 71.9 |
| Re-flow: Panels were baked again at 140 F. for 1 hour. 20 degree gloss is re-measured. | | | | |
| 20° gloss after re-flow bake | 60 | 80 | 80 | 82 |

The invention has been described in detail with reference to preferred embodiments thereof. It should be understood, however, that variations and modifications can be made within the spirit and scope of the invention.

What is claimed is:

1. A refinish, multi-component topcoat coating composition comprising:
   a first package comprising:
   (a) an unsaturated fatty acid ester polyol having a plurality of hydroxyl groups; and
   (b) an acrylic polymer resin comprising:
   a first styrenated acrylic resin having a hydroxyl number of 136 mg KOH/g, a number average molecular weight of 1,400 daltons, and a glass transition temperature of 24° C.; and
   a second styrenated acrylic resin having a hydroxyl number of 73 mg KOH/g, a number average molecular weight of 6,500 daltons, and a glass transition temperature of 78° C.;
   wherein the first package comprises from about 10% by weight to about 50% by weight of component (a), based on a total nonvolatile weight of components (a) and (b); and
   a second package comprising a polyisocyanate having a plurality of isocyanate groups.

2. A refinish, multi-component topcoat coating composition according to claim 1, wherein the unsaturated fatty acid ester polyol is a soy oil- or castor-oil-based polyol.

3. A refinish, multi-component topcoat coating composition according to claim 1, wherein the unsaturated fatty acid ester polyol comprises esterified ricinoleic acid.

4. A refinish, multi-component topcoat coating composition according to claim 1, wherein the unsaturated fatty acid ester polyol has three hydroxyl groups or four hydroxyl groups.

5. A refinish, multi-component topcoat coating composition according to claim 1, wherein the first package comprises from about 20% by weight to about 35% by weight of component (a), based on the total nonvolatile weight of components (a) and (b).

6. A refinish, multi-component topcoat coating composition according to claim 1, further comprising a plurality of pigmented first packages.

7. A method of increasing scratch resistance and/or reflow of a refinish topcoat, comprising preparing the topcoat from a refinish topcoat coating composition of claim 1, wherein the coating composition is free or essentially free of any drier.

8. The method of claim 7, wherein the unsaturated fatty acid ester polyol is from about 10% to about 50% by weight of the total nonvolatile weight of hydroxyl-functional materials.

9. The method of claim 7, wherein the unsaturated fatty acid ester polyol is a soy oil- or castor-oil-based polyol.

10. The method of claim 7, wherein the unsaturated fatty acid ester polyol has three or four hydroxyl groups.

11. A method of refinishing a substrate, comprising:
    (I) combining the first and second package of the multi-component topcoat composition of claim 1 to form a refinish coating composition mixture;
    (II) applying the refinish coating composition mixture to a desired area of the substrate; and
    (III) curing the applied composition mixture to form a cured refinish coating layer on the substrate.

12. A method of refinishing a substrate according to claim 11, wherein a plurality of first packages are combined in step (I).

13. A method of refinishing a substrate according to claim 11, wherein at least one pigmented first package is combined in step (I).

14. A method of refinishing a substrate according to claim 11, wherein the unsaturated fatty acid ester polyol is a soy oil- or castor-oil-based polyol.

15. A method of refinishing a substrate according to claim 11, wherein the unsaturated fatty acid ester polyol has three or four hydroxyl groups.

16. A substrate having thereon a refinish coating prepared according to the method of claim 11.

17. A refinish, multi-component topcoat coating composition according to claim 1, wherein the first styrenated acrylic resin and the second styrenated acrylic resin are present in the acrylic polymer in a ratio of 84 parts of the first styrenated acrylic resin to 16 parts of the second styrenated acrylic resin.

18. A refinish, multi-component topcoat coating composition according to claim 1, wherein a weight ratio of the first package to the second package is 1:0.59.

* * * * *